US006604139B1

(12) United States Patent
Sajina et al.

(10) Patent No.: US 6,604,139 B1
(45) Date of Patent: Aug. 5, 2003

(54) VOICE PROTOCOL FILTERING SYSTEM AND METHOD

(75) Inventors: Anna Sajina, Mountain View, CA (US); Kaiwang Zhang, Milpitas, CA (US)

(73) Assignee: Networks Associates Technology, Inc., Santa Clara, CA (US)

( * ) Notice: Subject to any disclaimer, the term of this patent is extended or adjusted under 35 U.S.C. 154(b) by 0 days.

(21) Appl. No.: 10/020,406

(22) Filed: Dec. 14, 2001

(51) Int. Cl.[7] .............................................. G06F 15/173
(52) U.S. Cl. ...................................................... 709/224
(58) Field of Search ................................ 709/223, 224; 370/252; 714/39

(56) References Cited

U.S. PATENT DOCUMENTS

| | | | |
|---|---|---|---|
| 5,323,452 A | 6/1994 | Dickman et al. ............ 379/201 |
| 5,519,830 A | 5/1996 | Opoczynski ............ 395/182.02 |
| 5,819,028 A | * 10/1998 | Manghirmalani et al. ..... 714/57 |
| 5,961,598 A | * 10/1999 | Sime ........................... 709/224 |
| 5,999,525 A | 12/1999 | Krishnaswamy et al. ... 370/352 |
| 6,122,665 A | * 9/2000 | Bar et al. .................... 709/224 |
| 6,138,127 A | 10/2000 | Pasch ......................... 707/206 |
| 6,192,255 B1 | 2/2001 | Lewis et al. ................ 455/558 |
| 6,195,116 B1 | 2/2001 | Lee .............................. 348/15 |
| 6,266,700 B1 | 7/2001 | Baker et al. ................ 709/230 |
| 6,311,278 B1 | 10/2001 | Raanan et al. .............. 713/201 |
| 6,349,335 B1 | * 2/2002 | Jenney ........................ 709/224 |
| 6,370,154 B1 | * 4/2002 | Wickham ................... 370/463 |
| 2001/0033650 A1 | 10/2001 | Wilson et al. .............. 379/398 |
| 2002/0101853 A1 | * 8/2002 | Siegrist et al. .............. 370/352 |
| 2002/0105911 A1 | * 8/2002 | Pruthi et al. ................. 370/241 |

FOREIGN PATENT DOCUMENTS

| | | | |
|---|---|---|---|
| EP | 0 948 164 A1 | 10/1999 | ........... H04L/12/26 |
| WO | 98/03023 | 1/1998 | ........... H04Q/3/00 |
| WO | 98/36559 | 8/1998 | ........... H04N/5/262 |
| WO | 99/19803 | 4/1999 | ........... G06F/13/00 |

OTHER PUBLICATIONS

Agilent Technologies, "Agilent Advisor IP Telephony Analyzer—Getting Started", Apr. 2001,www.onenetworks.comms.agilent.com, pp. 1–2, iii–iv, 1–1 to 3–16, and index i.*
Agilent Technologies, "Next generation Telephony: A Look at Session Initiationm Protocol—White Paper", Oct. 2001, www.agilent.com/comms/onenetworks, pp. 1–24.*
Agilent Technologies, "IP Telephony Reporter J5422A—Product Overview", Dec. 12, 2001, www.agilent.com/comms/onenetworks pp. 1–8.*
Agilent Technologies, "Troubleshooting H.323 Signaling—White Paper", Oct. 2001, www.agilent.com/comms/onenetworks, pp. 1–16.*
Agilent Technologies, "Troubleshooting VoIP Signaling—Application Note 1320", Oct. 2001, www.agilent.com/comms/onenetworks, pp. 1–18.*
Murrel, "Agilent Technologies Gives Network Managers New Tools to Increase Voice–Over–IP Quality and Reliability," Mar. 12, 2001, http://onenetworks.comms.agilent.com/PressReleases/PR–03–12a–2001.asp.

(List continued on next page.)

Primary Examiner—Bunjob Jaroenchonwanit
(74) Attorney, Agent, or Firm—Silicon Valley IP Group; Kevin J. Zilka; Christopher J. Hamaty

(57) ABSTRACT

A system, method and computer program product are provided for filtering various voice protocols. A plurality of voice protocols is initially displayed. Next, an indication is received from a user as to the selection of the voice protocols. It is further determined as to a particular filtering mode that is currently operating. Next, the selected voice protocols are filtered in the determined filtering mode.

2 Claims, 8 Drawing Sheets

OTHER PUBLICATIONS

"To: Network Troubleshooting Friends," May 2001, http://onenetworks.comms.agilent.com/NewsLetters/NEWSMay01.asp.

"Sniffer Voice 2.0," Jun. 14, 2001, Release Note.

"Agilent Technologies Telephony Network Analyzer J6843A Product Overview," Nov. 12, 2001, Agilent Technologies, Inc.

"Agilent Technoligies IP Telephony Network Analyzer J4618C Product Overview," Dec. 12, 2001, Agilent Technologies, Inc.

Agilent IP Telephony Analyzer (J4618C), Agilent Advisor, Agilent Technologies, Inc., 2001–2002, http://onenetworks.comms.aglient.com/agilentadvisor/J4618C_product.asp.

"Sniffer Voice, Providing Complete Network And Application Management," May 2001, Sniffer Technologies.

"Agilent NgN Analysis System," Jun. 5, 2001, Agilent Technologies.

* cited by examiner

VOICE PROTOCOL FILTERING SYSTEM AND METHOD

FIELD OF THE INVENTION

The present invention relates to network analysis, and more particularly to analyzing Voice over Internet Protocol (VoIP) calls.

BACKGROUND OF THE INVENTION

Voice signals are transmitted over a packet network by first formatting the voice signal data stream into multiple discrete packets. In a Voice Over Internet Protocol (VoIP) call, an originating voice gateway quantizes an input audio stream into packets that are placed onto a packet network and routed to a destination voice gateway. The destination voice gateway decodes the packets back into a continuous digital audio stream that resembles the input audio stream. As an option, a compression or decompression algorithm may be used on the quantized digital audio stream to reduce the communication bandwidth required for transmitting the audio packets over the network.

Similar to conventional Internet Protocol, VoIP includes a plurality of layers. Prior Art FIG. 1 illustrates a plurality of exemplary well known layers 10 associated with VoIP. As shown, such layers include at least one application layer 12 and a plurality of session layers 14 positioned below the application layer 12. While not shown, at least one connection layer may be positioned below the session layer. By way of example, the application layer 12 may include H.323. H.323 is a standard approved by the International Telecommunication Union (ITU) in 1996 to promote compatibility in videoconference transmissions over IP networks. Further included as session layers are H.225.0, H.245, real-time transport protocol (RTP), and real-time transport control protocol (RTCP). It should be noted that VoIP calls can employ various protocols for communication purposes.

The Quality of Service (QoS) of VoIP calls can degrade due to congestion on the packet network or failure of network processing nodes in the packet network. Quality of service can include anything from call sound quality to the ability and responsiveness of the VoIP network in establishing new VoIP calls. IP network reliability has not been proven to be in the same class as a traditional switched Public Services Telephone Network (PSTN).

Due to a need to understand, troubleshoot and optimize a particular network to improve VoIP calls, there is an on-going desire for traditional network assessment tools to be tailored to monitor network parameters specific to VoIP calls. Network assessment tools referred to as "analyzers" are often relied upon to analyze networks communications at a plurality of layers. One example of such analyzers is the SNIFFER ANALYZER™ device manufactured by NETWORK ASSOCIATES, INC™. Analyzers have similar objectives such as determining why network performance is slow, understanding the specifics about excessive traffic, and/or gaining visibility into various parts of the network.

As mentioned earlier, network analyzers collect information at a plurality of layers. Each set of layer-specific data is conventionally stored in a buffer "object" by the network analyzer. In particular, a session object, an application object, etc. are each used to store network traffic information at session and application layers, respectively. Further, each specific type of voice protocol data may be stored in a dedicated object.

In use, a separate object is established for data collected at each application and session layer for each VoIP call. With the number of such objects growing proportionally with the overall VoIP calls and the number of voice protocols associated therewith, managing related network data for monitoring, reporting and analysis purposes may become quite cumbersome.

There is thus a need for a more efficient and effective technique for collecting and managing VoIP call network data for analysis purposes.

DISCLOSURE OF THE INVENTION

A system, method and computer program product are provided for filtering various voice protocols. A plurality of voice protocols is initially displayed. Next, an indication is received from a user as to the selection of the voice protocols. It is further determined as to a particular filtering mode that is currently operating. Next, the selected voice protocols are filtered in the determined filtering mode.

In one embodiment, the voice protocols may include H.323, H.225, H.245, registration admission status protocol (RAS), real-time transport protocol (RTP), real-time transport control protocol (RTCP), session description protocol (SDP), session announcement protocol (SAP), session initiation protocol (SIP), skinny client control protocol (SCCP), and/or media gateway control protocol (MGCP). Further, the filtering modes may include a monitor mode, a capture mode, and/or a display mode.

In another embodiment, the voice protocols may be displayed in response to the selection of a filter icon. Moreover, the voice protocols may be selected utilizing a plurality of check boxes. Still yet, the filtering may be displayed in a tree representation for reporting purposes.

Another system, method and computer program product are provided for filtering various voice protocols. Initially, a plurality of voice protocol filters is displayed. An indication is then received from a user as to the selection of at least one of the voice protocol filters. Next, a plurality of voice protocols associated with the selected voice protocol filter is displayed. Another indication from the user is received as to the selection of the voice protocols to be associated with the voice protocol filter.

During an analysis, a voice application call is then identified, and a plurality of connection, session, and application objects associated with the voice application call are collected based on the selected voice protocols. Such connection objects, session objects, and application objects are subsequently displayed. By allowing a user to select the voice protocol filters and further define the same, the collection and analysis of the connection, session, and application objects is more focused and manageable.

BRIEF DESCRIPTION OF THE DRAWINGS

Prior art

DESCRIPTION OF THE PREFERRED EMBODIMENTS

Figure 1:
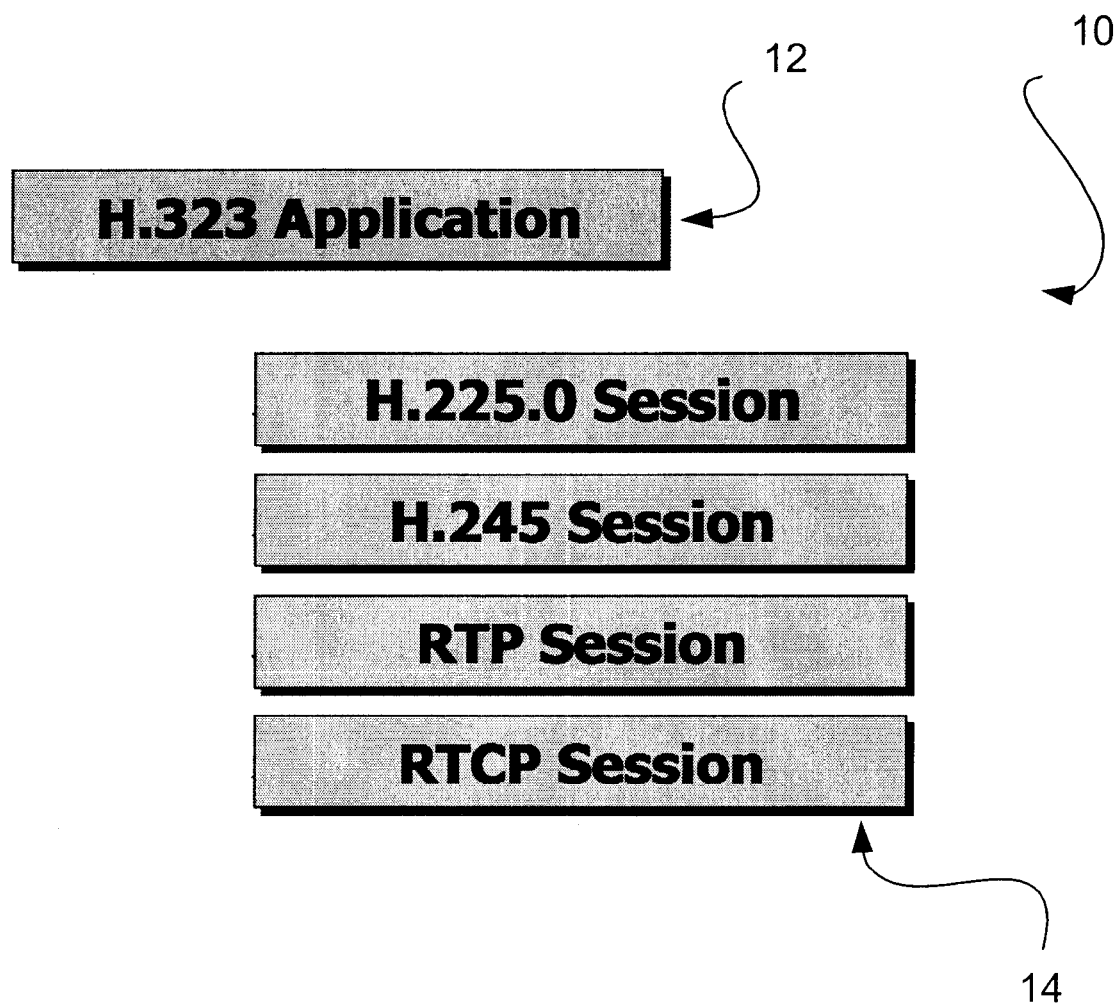
FIG. 1 illustrates exemplary protocol layers associated with Voice over Internet Protocol (VoIP) calls.
Figure 1A:
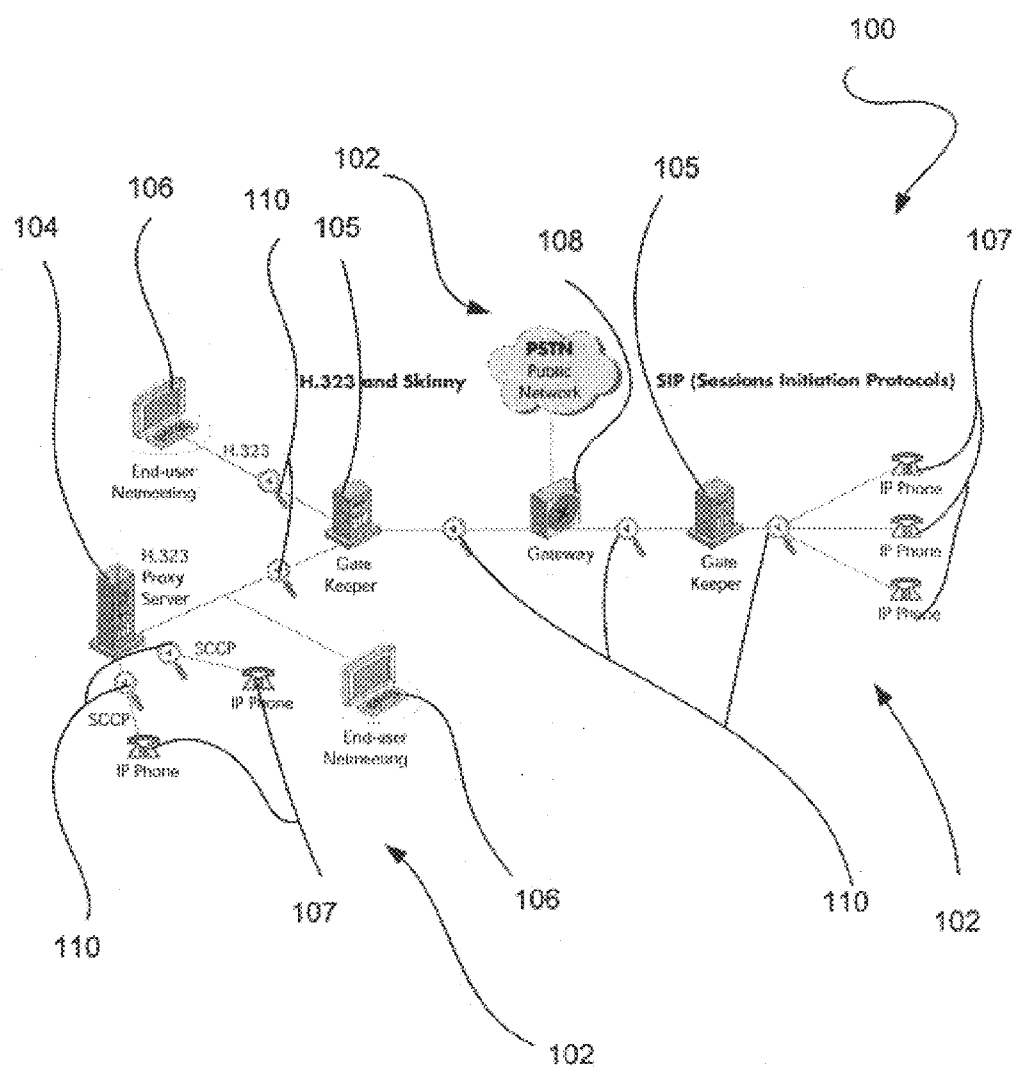
FIG. 1A illustrates an exemplary network architecture, in accordance with one embodiment.

FIG. 1A illustrates a network architecture 100, in accordance with one embodiment. As shown, a plurality of networks 102 is provided. In the context of the present network architecture 100, the networks 102 may each take any form including, but not limited to a local area network (LAN), a public switched telephone network (PSTN), a wide area network (WAN) such as the Internet, etc.

Coupled to the networks 102 are servers 104 and gatekeepers 105 which are capable of communicating over the networks 102. Also coupled to the networks 102 and the servers 104 is a plurality of end user devices 106. In the context of the present description, such end user devices 106 may include a web server, desktop computer, lap-top computer, hand-held computer, or any other type of hardware/software.

Also included is a plurality of Internet Protocol (IP) telephones 107 coupled to the various servers 104 and end user devices 106. In use, the IP telephones 107 are adapted for communicating via the networks 102 utilizing IP. It should be noted that the IP telephones 107 may be operated in accordance with any desired protocol including, but not limited to H.323, H.225, H.245, registration admission status protocol (RAS), real-time transport protocol (RTP), real-time transport control protocol (RTCP), session description protocol (SDP), session announcement protocol (SAP), session initiation protocol (SIP), skinny client control protocol (SCCP), media gateway control protocol (MGCP), and/or any other desired protocol capable of handling VoIP.

In order to facilitate communication among the networks 102, at least one gateway 108 is coupled therebetween. It should be noted that each of the foregoing network devices as well as any other unillustrated devices may be interconnected by way of a plurality of network segments. In the context of the present description, a network segment includes any portion of any particular network capable of connecting different portions and/or components of a network.

Resident on any of the foregoing components and/or network segments may be a network assessment tool such as a network analyzer 110. Each network analyzer 110 may be relied upon to analyze networks communications at a plurality of layers. One example of such analyzer 110 is the SNIFFER ANALYZER™ device manufactured by NETWORK ASSOCIATES, INC™. In use, the analyzer 110 may collect information for the purpose of determining why network performance is slow, understanding the specifics about excessive traffic, and/or gaining visibility into various parts of the network.

In use, the network analyzers 110 are capable of filtering various voice protocols. To accomplish this, a plurality of voice protocols is initially displayed. As an option, the voice protocols may include, but are not limited to H.323, H.225, H.245, registration admission status protocol (RAS), real-time transport protocol (RTP), realtime transport control protocol (RTCP), session prescription protocol (SDP), session announcement protocol (SAP), session initiation protocol (SIP), skinny client control protocol (SCCP), and/or media gateway control protocol (MGCP).

Next, an indication is received from a user as to the selection of the voice protocols. It is further determined as to a particular filtering mode that is currently operating. Such filtering mode may include any mode in which the network analyzer is capable of operating. Next, the selected voice protocols are filtered in the determined filtering mode.

During this filtering, a voice application call is identified. In the context of the present description, a voice application call may include any type of communication of voice signals over a packet-switched network. Just by way of example, the voice application call may include communication utilizing IP telephones similar to those of FIG. 1 with a desired protocol.

Next, a plurality of objects is generated associated with the voice application call. In the context of the present description, an object may refer to buffer, memory, a table or any other set of a data that is associated with a specific communication protocol layer (i.e. connection, session, application, etc.). Of course, various other layers may be represented by other objects.

By allowing the user to select the particular voice protocols, only the desired objects are collected. This provides for not only more efficient collection of information, but also a more efficient analysis, since the user is not inundated with undesired information.

Figure 2:
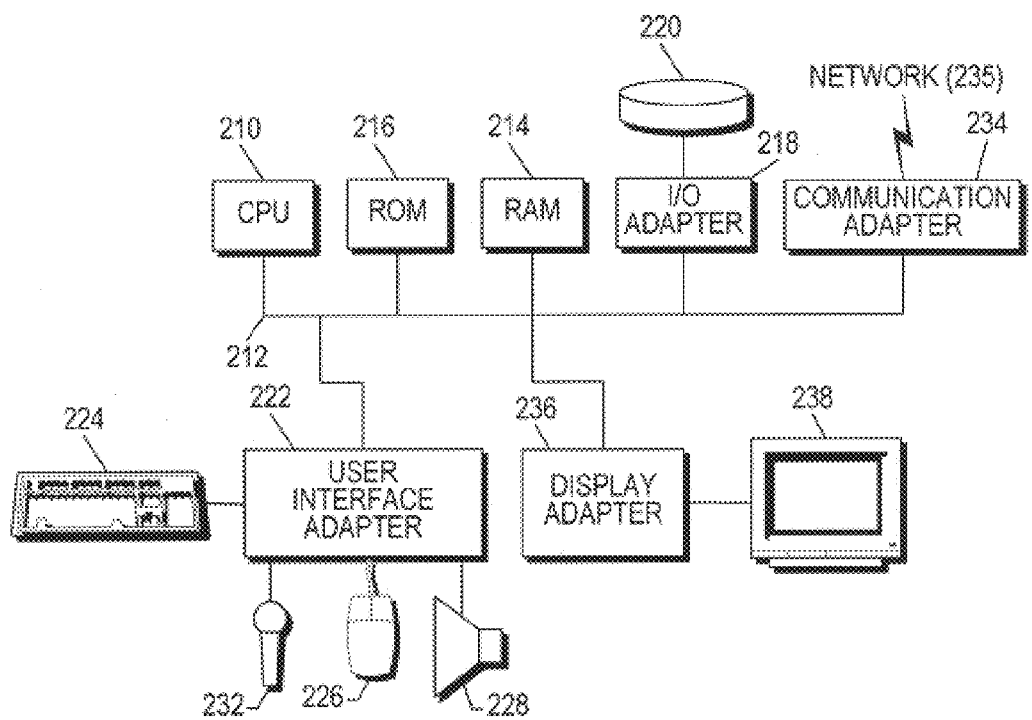
FIG. 2 shows a representative hardware environment that may be associated with the data servers and user devices of FIG. 1A, in accordance with one embodiment.

FIG. 2 shows a representative hardware environment that may be associated with the data servers 104 and/or end user computers 106 of FIG. 1A, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
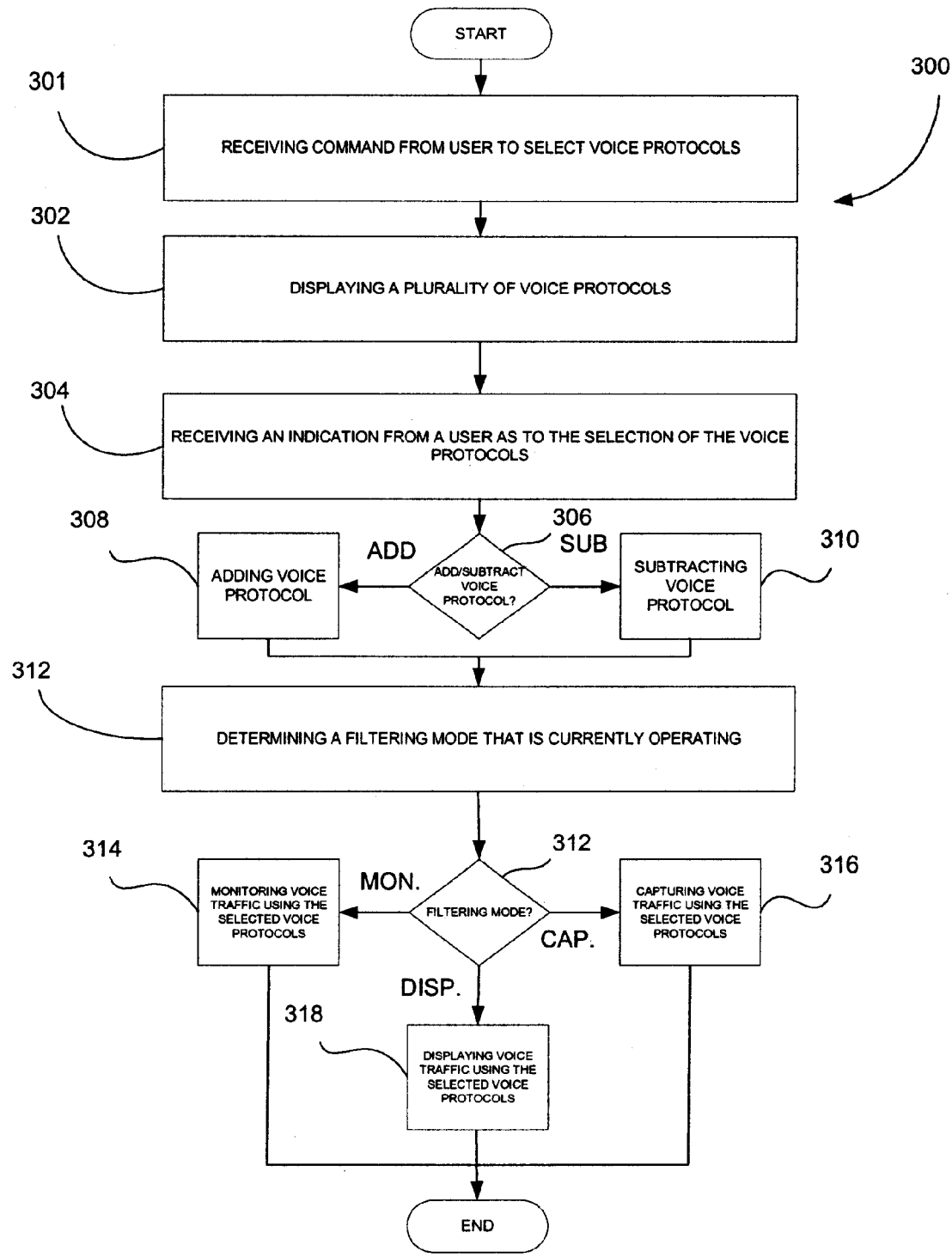
FIG. 3 illustrates a method for filtering various voice protocols, in accordance with one embodiment.

FIG. 3 illustrates a method 300 for filtering various voice protocols, in accordance with one embodiment. As an option, the present method 300 may be used in the context of a network analyzer like that mentioned during reference to FIG. 1. Of course, the present techniques may be utilized in any desired context.

Initially, a command may be received by a user indicating that the user wishes to select specific voice protocols for analysis purposes. See operation 301. Of course, the remaining operations of the present method 300 may or may not require a command from the user for initiation. More information regarding an exemplary pull down menu adapted for initiating the selection process will be set forth during reference to FIG. 4.

In operation 302, a plurality of voice protocol filters is displayed. In the context of the present description, a voice protocol filter may include any scheme or technique capable of monitoring, capturing, analyzing, and/or displaying network communications involving voice protocols.

This display of voice protocol filters may be initiated in response to the command in operation 301, or in any desired manner. More information regarding associated windows for displaying the voice protocols will be set forth during reference to FIGS. 5–6. Of course, the display of the available voice protocol filters may be carried out in any desired manner.

Using the displayed voice protocols filters, the user may select desired voice protocol filters to be used in operation 304. This may be accomplished in any desired manner which indicates the selection of certain voice protocol filters.

As an option, the voice protocols filters may be further edited or designed from scratch. For example, a user may have the option of adding or removing voice protocols in decision 306 to a predetermined filter. In response thereto, the voice protocols may be added or removed from a list of protocols to be filtered. See operations 308 and 310. Again, this may be accomplished by any desired input technique. One exemplary selection interface will be set forth during reference to FIGS. 5–6.

It is further determined as to a particular filtering mode that is currently operating in decision 312. For example, the filtering modes may include a monitor mode (see operation 314), a capture mode (see operation 316), and/or a display mode (see operation 318).

It should be noted, however, that the filtering modes may vary per the desires of the user. For example, the filtering modes may include any manner in which the protocol filtering may be used to monitor network voice communication data, collect network voice communication data, display network voice communication data, or perform any other analysis-related function with the network voice communication data.

Figure 4:
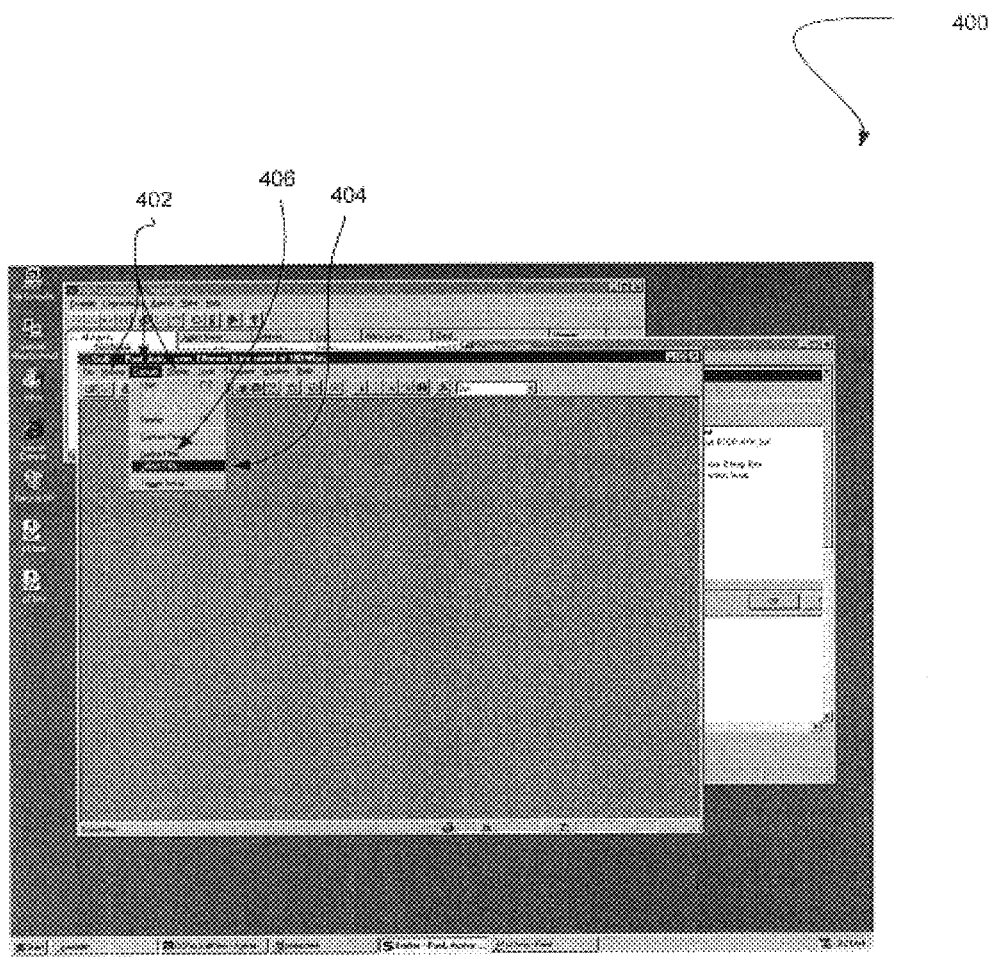
FIG. 4 illustrates an exemplary network analyzer graphical user interface adapted for allowing a user to select certain voice protocols for filtering, in accordance with operation 301 of FIG. 3.

FIG. 4 illustrates an exemplary network analyzer graphical user interface 400 adapted for allowing a user to select certain voice protocols for filtering, in accordance with operation 301 of FIG. 3. It should be noted that the initiation process may take any desired form, or not at all, per the desires of the user.

As shown, the network analyzer graphical user interface 400 includes a window with a plurality of functional pull down menus 402 adapted for allowing a user to control, customize, etc. an analysis of voice communication traffic over a network. One exemplary view of such analysis will be set forth during reference to FIG. 7.

At any desired time during network analysis, a user may choose a "select filter" option 404 under either a capture, monitor or display pull down menu 402. It should be noted that a different set of voice protocol filtering may be associated with each of the capture, monitor or display pull down menus 402. In other words, a different selected type of voice protocol filtering may be carried out when the network analyzer operates in a capture mode, a monitor mode, a display mode, etc. Once the "select filter" option 404 is selected, various pre-defined filters may be selected to associate with the current mode of operation. One exemplary graphical user interface for selecting such predefined filters will be set forth during reference to FIG. 5.

If there are no currently defined voice filters to select, a user may also choose a "define filter" option 406 under either a capture, monitor or display pull down menu 402. By this feature, a user may define a new filter which may be capable of monitoring, capturing, or displaying user-selected voice protocols.

Figure 5:
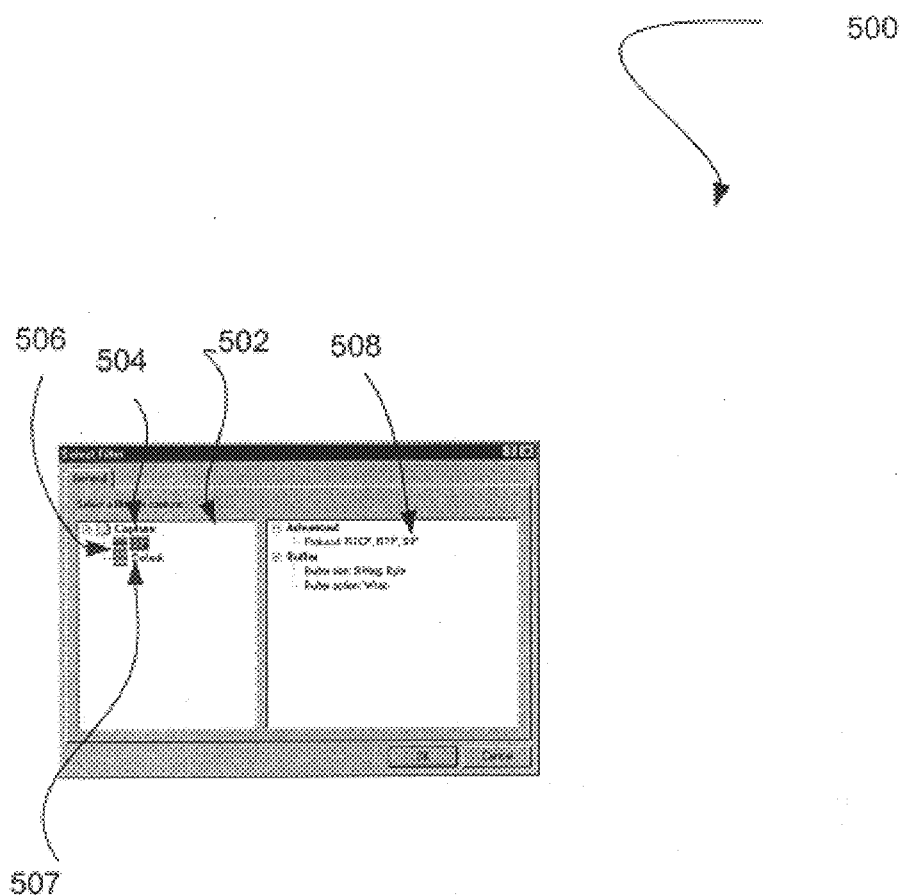
FIG. 5 illustrates an exemplary graphical user interface for displaying voice protocol filtering schemes and receiving an indication as to a filtering scheme selection made by a user, in accordance with operations 302 and 304 of FIG. 3.

FIG. 5 illustrates an exemplary graphical user interface 500 for displaying voice protocol filtering schemes and receiving an indication as to a filtering scheme selection made by a user, in accordance with operations 302 and 304 of FIG. 3. It should be noted that the display and selection operations of the method 300 of FIG. 3 may take any desired form, and should not be limited to the exemplary interface 500.

The graphical user interface 500 is shown in response to the selection of the "select filter" option 404 under either the capture, monitor or display pull down menu 402 of FIG. 4. Of course, the graphical user interface 500 may be displayed in any desired manner. As shown, the graphical user interface 500 includes a first window 502 which indicates the current mode 504 with which the pre-defined filtering schemes are associated. Further, a tree representation 506 of all available pre-defined filters 507 is shown. It should be noted that a filter 507 may be provided for a variety of higher level protocols. In use, a user may simply select the desired pre-defined filter 507 for "enabling" it for use during the current mode of operation.

As an option, a second window 508 may be provided for showing the specific voice protocols associated the pre-defined filters 507. For example, a Session Initiation Protocol (SIP) filter may be capable of monitoring voice communication involving SIP, RTP, RTCP voice protocols. In use, a user may optionally, select one of the pre-defined filter 507 for re-defining or editing the same to cover other types of voice protocols. In one embodiment, this may be accomplished by simply "double-clicking" on the predefined filters 507 to be edited. By doing so, another exemplary interface may be displayed for allowing a user to edit a pre-defined filter. One exemplary graphical user interface for editing such pre-defined filters will be set forth during reference to FIG. 6.

Figure 6:
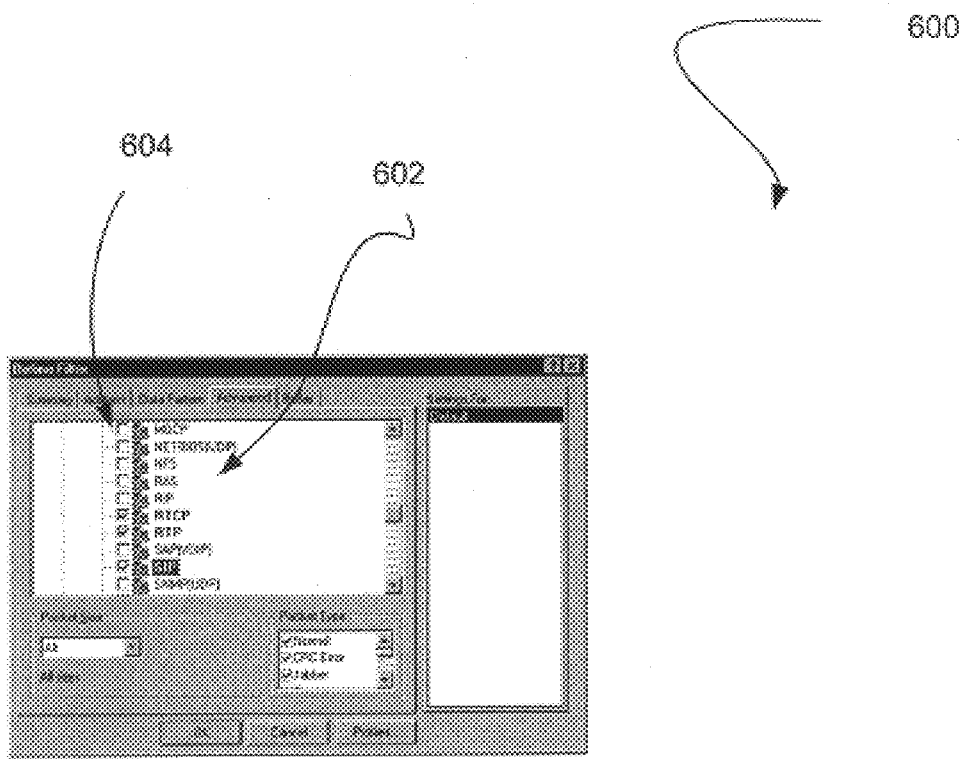
FIG. 6 illustrates an exemplary graphical user interface for editing and defining voice protocol filtering schemes, in accordance with operations 306 through 310 of FIG. 3.

FIG. 6 illustrates an exemplary graphical user interface 600 for editing and defining voice protocol filtering schemes, in accordance with operations 306 through 310 of FIG. 3. Such operations of the method 300 of FIG. 3 may take any desired form, and should not be limited to the exemplary interface 600.

It should be noted that the graphical user interface 600 may be displayed in response to the selection of the "define filter" option 406 under either the capture, monitor or display pull down menu 402 of FIG. 4. Moreover, this may be accomplished by also selecting one of the pre-defined filter 507 in FIG. 5.

As shown, graphical user interface 600 lists a plurality of voice protocols 602 to be associated with a particular filter. As an option, the voice protocols may be added and/or removed utilizing a plurality of check boxes 604.

The present technique thus allows a user to tailor an analysis by the selection and definition of voice protocol filters to filter user-selected voice protocols. An example of how these filters may be used will now be set forth.

Figure 7:
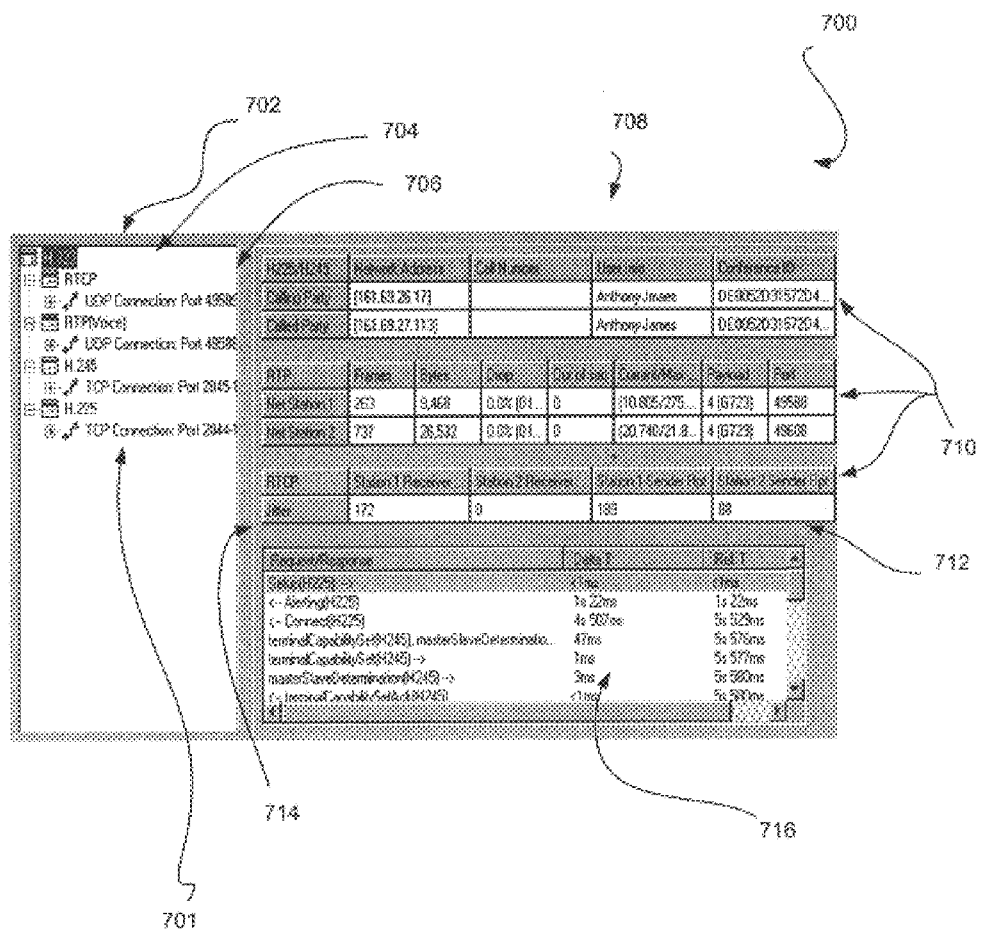
FIG. 7 illustrates a graphical user interface showing an exemplary output of the chosen filters, in accordance with one embodiment.

FIG. 7 illustrates a graphical user interface 700 showing an exemplary output of the chosen filters, in accordance with one embodiment. As shown, a tree representation 701 may be displayed as any desired combination of file directories 702 including a plurality of subdirectories 704 which, in turn, includes a plurality of files 706. Each of such entities is indicative of an associated object of information that was collected via an associated protocol filter. By selectively designing/editing the protocol filters in the aforementioned manner, only those objects in which the user is interested are displayed, thus making the overall analysis more manageable.

By selecting one of the aforementioned objects, collected data associated with a specific protocol layer(s) is displayed in a tabular display 708. FIG. 7 specifically shows a tabular display 708 resulting from the selection of an application object in the representation 701.

Such tabular display 708 includes a plurality of display portions 710 each dedicated to displaying information associated with lower-layer objects corresponding to the object selected via the tree representation 701. In the present example, an application object is selected, thus a plurality of session objects are displayed in the tabular display 708. In particular, each session object displayed in the display portions 710 includes a matrix having a plurality of x-axis parameters 712 and y-axis parameters 714 unique to the specific protocol corresponding to the object.

For example, an H225/H245 object may include calling party, called party, network address, call number, user information, conference identifier, etc. for describing communications at that particular session layer of a voice application call. Still yet, an RTP object may include a first network station, a second network station, frames, bytes, dropped percentage, out of sequence numbers, current/maximum parameters, payload size, port number, etc. In another example, an RTCP object may include jitter, a first station receiver, a second station receiver, a first station sender, a second station sender, etc.

As an option, the tabular display 708 may further include a request/response field 716 which may list a plurality of requests and responses at the selected protocol layer. Also listed may be specific time periods and relative time periods associated with the requests and responses for providing an in-depth, detailed view of the specific voice application call communications.

By selecting only those protocols in which the user is interested, the data in the tabular display 708 is more manageable. This provides for not only more efficient collection of information, but also a more efficient analysis, since the user is not inundated with unimportant information.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A filtering method for voice protocols, comprising:

(a) displaying a plurality of voice protocols selected from the group consisting of H.323, H.225, H.245, registration admission status protocol (RAS), real-time transport protocol (RTP), real-time transport control protocol (RTCP), session description protocol (SDP), session announcement protocol (SAP), session initiation protocol (SIP), skinny client control protocol (SCCP), and media gateway control protocol (MGCP);

(b) receiving an indication from a user as to the selection of the voice protocols;

(c) identifying a voice application call;

(d) generating a plurality of connection objects associated with the voice application call based on the selected voice protocols;

(e) generating a plurality of session objects associated with the voice application call based on the selected voice protocols;

(f) generating a plurality of application objects associated with the voice application call based on the selected voice protocols; and (g) displaying the connection objects, the session objects, and the application objects.

2. A filtering method for voice protocols, comprising:

(a) displaying a plurality of voice protocol filters;

(b) receiving an indication from a user as to the selection of one of the voice protocol filters;

(c) displaying a plurality of voice protocols associated with the selected voice protocol filter;

(d) receiving an indication from the user as to the selection of the voice protocols to be associated with the voice protocol filter;

(e) identifying a voice application call;

(f) generating a plurality of connection objects associated with the voice application call based on the selected voice protocols;

(g) generating a plurality of session objects associated with the voice application call based on the selected voice protocols;

(h) generating a plurality of application objects associated with the voice application call based on the selected voice protocols; and (i) displaying the connection objects, the session objects, and the application objects.

* * * * *